United States Patent
Hoffmann

(10) Patent No.: US 12,328,533 B2
(45) Date of Patent: Jun. 10, 2025

(54) SCANNING THE SURROUNDINGS OF A VEHICLE

(71) Applicant: Bayerische Motoren Werke Aktiengesellschaft, Munich (DE)

(72) Inventor: Philipp Hoffmann, Hannover (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 48 days.

(21) Appl. No.: 18/075,872

(22) Filed: Dec. 6, 2022

(65) Prior Publication Data

US 2023/0179743 A1    Jun. 8, 2023

(51) Int. Cl.
| | |
|---|---|
| *H04N 7/18* | (2006.01) |
| *B60R 1/26* | (2022.01) |
| *H04N 5/265* | (2006.01) |
| *H04N 23/90* | (2023.01) |

(52) U.S. Cl.
CPC ............. *H04N 7/181* (2013.01); *B60R 1/26* (2022.01); *H04N 5/265* (2013.01); *H04N 23/90* (2023.01); *B60R 2300/105* (2013.01); *B60R 2300/20* (2013.01); *B60R 2300/304* (2013.01)

(58) Field of Classification Search
CPC ........ H04N 7/181; H04N 5/265; H04N 23/90; H04N 25/711; H04N 25/768; B60R 1/26; B60R 2300/105; B60R 2300/20; B60R 2300/304
See application file for complete search history.

(56) References Cited

U.S. PATENT DOCUMENTS

| | | | | |
|---|---|---|---|---|
| 11,892,571 | B2* | 2/2024 | Golomedov | G01S 7/497 |
| 2005/0110621 | A1* | 5/2005 | Hahn | H04N 7/181 |
| | | | | 348/E7.086 |
| 2006/0239508 | A1* | 10/2006 | Maki | G06V 20/588 |
| | | | | 382/104 |
| 2007/0280506 | A1* | 12/2007 | Hahn | G06T 5/70 |
| | | | | 382/104 |
| 2008/0024608 | A1* | 1/2008 | Hahn | H04N 23/11 |
| | | | | 348/148 |

(Continued)

FOREIGN PATENT DOCUMENTS

| | | | |
|---|---|---|---|
| DE | 10 2015 214 900 A1 | 2/2017 | |
| DE | 10 2017 109 445 A1 | 11/2018 | |
| WO | WO-2017021197 * | 2/2017 | ............ H04N 5/04 |

OTHER PUBLICATIONS

German-language Search Report issued in German Application No. 10 2021 132 334.7 dated Apr. 21, 2022 with partial English translation (12 pages).

*Primary Examiner* — Brian P Yenke
(74) *Attorney, Agent, or Firm* — Crowell & Moring LLP

(57) ABSTRACT

A vehicle moves in relation to the surroundings along a movement direction. The vehicle includes a first and a second camera. The first camera is arranged in front of the second camera along the movement direction. A method for scanning the surroundings from the vehicle includes scanning a first image by the first camera; scanning a second image by the second camera; and combining the first and the second image to form an overall image. The second image is scanned with a time delay in relation to the first image, so that an offset of locations at which the images are scanned is less than an offset of the cameras on board the vehicle.

9 Claims, 3 Drawing Sheets

(56) References Cited

U.S. PATENT DOCUMENTS

| | | | |
|---|---|---|---|
| 2009/0201361 A1* | 8/2009 | Lyon | H04N 25/531 |
| | | | 348/148 |
| 2010/0034426 A1* | 2/2010 | Takiguchi | G01C 21/3602 |
| | | | 382/106 |
| 2010/0060735 A1 | 3/2010 | Sato | |
| 2013/0329017 A1* | 12/2013 | Hayakawa | H04N 13/296 |
| | | | 348/47 |
| 2014/0214271 A1* | 7/2014 | Choi | B60R 1/002 |
| | | | 701/36 |
| 2015/0078678 A1* | 3/2015 | Grandin | H04N 23/45 |
| | | | 382/284 |
| 2015/0092988 A1* | 4/2015 | Mitoma | G01C 3/085 |
| | | | 382/104 |
| 2017/0116710 A1* | 4/2017 | Schmidt | G06T 3/4038 |
| 2017/0132476 A1* | 5/2017 | Chien | H04N 23/698 |
| 2017/0182942 A1* | 6/2017 | Hardy | G02B 27/0101 |
| 2018/0176482 A1* | 6/2018 | Lu | G06T 3/4038 |
| 2018/0293442 A1* | 10/2018 | Fridental | G06V 10/776 |
| 2019/0051030 A1* | 2/2019 | Choi | H04N 23/90 |
| 2019/0289172 A1* | 9/2019 | Bangs | H04N 13/296 |
| 2019/0327415 A1* | 10/2019 | Prabhakar | H04N 23/667 |
| 2020/0174130 A1* | 6/2020 | Banerjee | G05D 1/0248 |
| 2020/0366883 A1* | 11/2020 | Matsuura | H04N 23/45 |
| 2020/0387724 A1* | 12/2020 | Maruyama | G06V 20/597 |
| 2021/0191390 A1* | 6/2021 | Hwang | B64U 30/20 |
| 2021/0290056 A1* | 9/2021 | Karandikar | A61B 3/117 |
| 2023/0117253 A1* | 4/2023 | Molad | G06T 7/20 |
| | | | 382/103 |

\* cited by examiner

SCANNING THE SURROUNDINGS OF A VEHICLE

CROSS REFERENCE TO RELATED APPLICATION

This application claims priority under 35 U.S.C. § 119 from German Patent Application No. 10 2021 132 334.7, filed Dec. 8, 2021, the entire disclosure of which is herein expressly incorporated by reference.

BACKGROUND AND SUMMARY OF THE INVENTION

The present invention relates to the scanning of the surroundings of a vehicle. In particular, the invention relates to providing a scan on the basis of images of multiple cameras attached offset on the vehicle.

A vehicle comprises multiple cameras, for example a reversing camera attached to the rear and a side camera attached in the region of a vehicle pillar. The cameras are configured to scan the surroundings of the vehicle. Scanning ranges of the camera can overlap one another and in particular be oriented to the rear from the vehicle. The images can be presented to a driver on board the vehicle via a rearview mirror, so that he can obtain an improved impression of the surroundings of the vehicle.

Simultaneously scanned images have different perspectives due to the different attachment locations of the cameras on the vehicle. If the images are observed jointly, a parallax error therefore results, which can make uniform perception more difficult. In particular for a driver of the vehicle, however, it can be essential to obtain a uniform and accurate overview of the surroundings of the vehicle, so that he can safely control the vehicle in dependence on the surroundings.

One underlying object of the present invention is to specify an improved technology for providing a view of the surroundings of a vehicle using multiple cameras arranged offset in relation to one another. This object is achieved by the claimed invention.

A vehicle moves in relation to the surroundings along a movement direction. The vehicle comprises a first and a second camera; wherein the first camera is arranged in front of the second camera along the movement direction.

According to a first aspect of the present invention, a method for scanning the surroundings from the vehicle comprises steps of scanning a first image by the first camera; scanning a second image by the second camera; and combining the first and the second image to form an overall image. The second image is scanned with a time delay in relation to the first image, so that an offset of locations at which the images are scanned is less than the offset of the cameras on board the vehicle.

An offset can be understood as a route which flows directly between the attachment locations of the cameras. Alternatively, the offset can also be related to a movement direction of the vehicle. Alternatively, the offset can furthermore relate to a route which the vehicle covers between the predetermined points in time. This route can extend along a trajectory straight or also in curve form, so that the route along the trajectory can be longer than the direct route.

Due to the delay of the second image in relation to the first image, locations at which the images are recorded can be moved toward one another. Perspectives of the images can therefore correspond better to one another or can have a lesser deviation from one another. The deviation can essentially only still be dependent on a lateral offset of the cameras on board the vehicle. A parallax error when combining the two images to form the overall image can be reduced. A time-delayed display of a content of the first image caused by the method can be harmless, since contents of the second image can be provided without delay. The time delay can be dependent on a movement speed of the vehicle and an offset of the cameras on the vehicle. At a typical travel speed of the vehicle, the time delay can be only a few milliseconds, so that no noticeable information delay is perceptible to an observer of the overall image.

In a first variant, the images are provided simultaneously on different display surfaces on board the vehicle. The first camera can be attached, for example, in the region of a windshield of the vehicle, in particular close to a first vehicle pillar (A-pillar). The first image can be displayed in an interior of the vehicle close to the camera. If the first camera is attached on the left on the vehicle, the display of the first image thus preferably takes place on a display attached on the left in the interior. In a corresponding manner, a first image of a first camera attached on the right can be output on a display which is attached on the right in the interior. A combination of a first camera and an assigned display can also be called a camera-monitor system (CMS). The second camera can be attached in the region of the rear of the vehicle, in particular centrally. The second image can be attached on a center console of the vehicle. The display for the second image can in particular be attached between displays for the first images. The displays can adjoin one another or can be spaced apart from one another here.

In another variant, the images are combined by stitching to form the overall image. Stitching refers here to an algorithm in order to assemble a large image from various, usually overlapping individual images in photography. Image angles deviating from one another and other geometrical distortions are adapted to one another here. In addition, an exposure or color equalization can be carried out between the images. The overall image can be output on a common display surface. This display surface can be located, for example, on the described center console or can be covered by a head-up display.

The time delay between the scanning of the first image and the scanning of the second image is preferably determined in dependence on a movement speed of the vehicle. The faster the vehicle moves, the shorter the time delay can be. The movement speed of the vehicle can be determined in different ways, for example, by odometer, by way of an acceleration sensor, on the basis of scans from rotation sensors on wheels of the vehicle, a photogrammetric method, or items of position information of a receiver for a radio navigation system such as GPS or Galileo.

If a point in time of the recording of a first or a second image can be controlled, the point in time can thus be selected as a function of the movement speed of the vehicle so that the offset is minimized. However, a camera is often used which provides a sequence of images at a predetermined frequency. In this case, an optimization can be carried out by selecting one image from the sequence.

In one embodiment, the second camera provides second images at a predetermined frequency, wherein a second image is selected which was scanned at a location, the offset of which is minimized in relation to the location at which the first image was scanned. The offset can be positive or negative with respect to the movement of the vehicle. In this embodiment, the first camera can also operate at a predetermined frequency. The frequencies can differ from one another or can be equal. In the case of equal frequencies, a predetermined phase difference can exist between scans of the images. The frequencies and possibly the phase difference can be taken into consideration in the assignment of a second image to a first image in order to achieve the desired minimization of the offset of recording locations.

In a further embodiment, the overall image is determined in consideration of a distance of the locations transverse to the travel direction. If the vehicle travels through a curve during the time delay, a distance between the positions at which the images are scanned thus changes in a direction transverse to the vehicle. A similar effect can arise when the vehicle drifts. To compensate for this offset, one of the images can accordingly be displaced on a display surface assigned to it transversely to the travel direction. In the case of the combination of both images to form an overall image by stitching, the lateral offset of the images in relation to one another can be taken into consideration accordingly.

It is particularly preferred that the distance transverse to the travel direction is determined on the basis of a yaw movement of the vehicle during the time delay. The yaw movement can be determined by way of one or more sensors or with respect to a determined trajectory of the vehicle.

According to a second aspect of the present invention, a scanning system on board a vehicle, which moves along a movement direction in relation to the surroundings, comprises a first camera for scanning a first image of the surroundings; a second camera for scanning a second image of the surroundings; wherein the cameras are arranged offset along the movement direction; and a control device. The control device is configured to provide the second image with a time delay in relation to the first image, so that an offset of locations at which the images are scanned is less than an offset of the cameras on board the vehicle.

The control device is preferably configured to minimize the offset of the scanning locations of the images and ideally set it to zero. In one preferred embodiment, the control device is configured to partially or completely carry out a method described herein. For this purpose, the control device can in particular comprise a programmable microcomputer or microcontroller. The method can be provided in the form of a computer program product having program code and is optionally stored on a computer-readable data carrier. Features or advantages of the method can be transferred to the scanning system and vice versa.

In a first variant, the control device is configured to activate the first or the second camera to scan the second image. A time offset between the recording of the first and the second image can be predetermined on the basis of a movement of the vehicle.

In a second variant, the control device is configured to select one from a series of images of one of the cameras scanned with a time offset. This procedure suggests itself in particular if one or both cameras provide series of images, the chronological relationship of which cannot be controlled by the control device.

According to still a further aspect of the present invention, a vehicle comprises a scanning system described herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
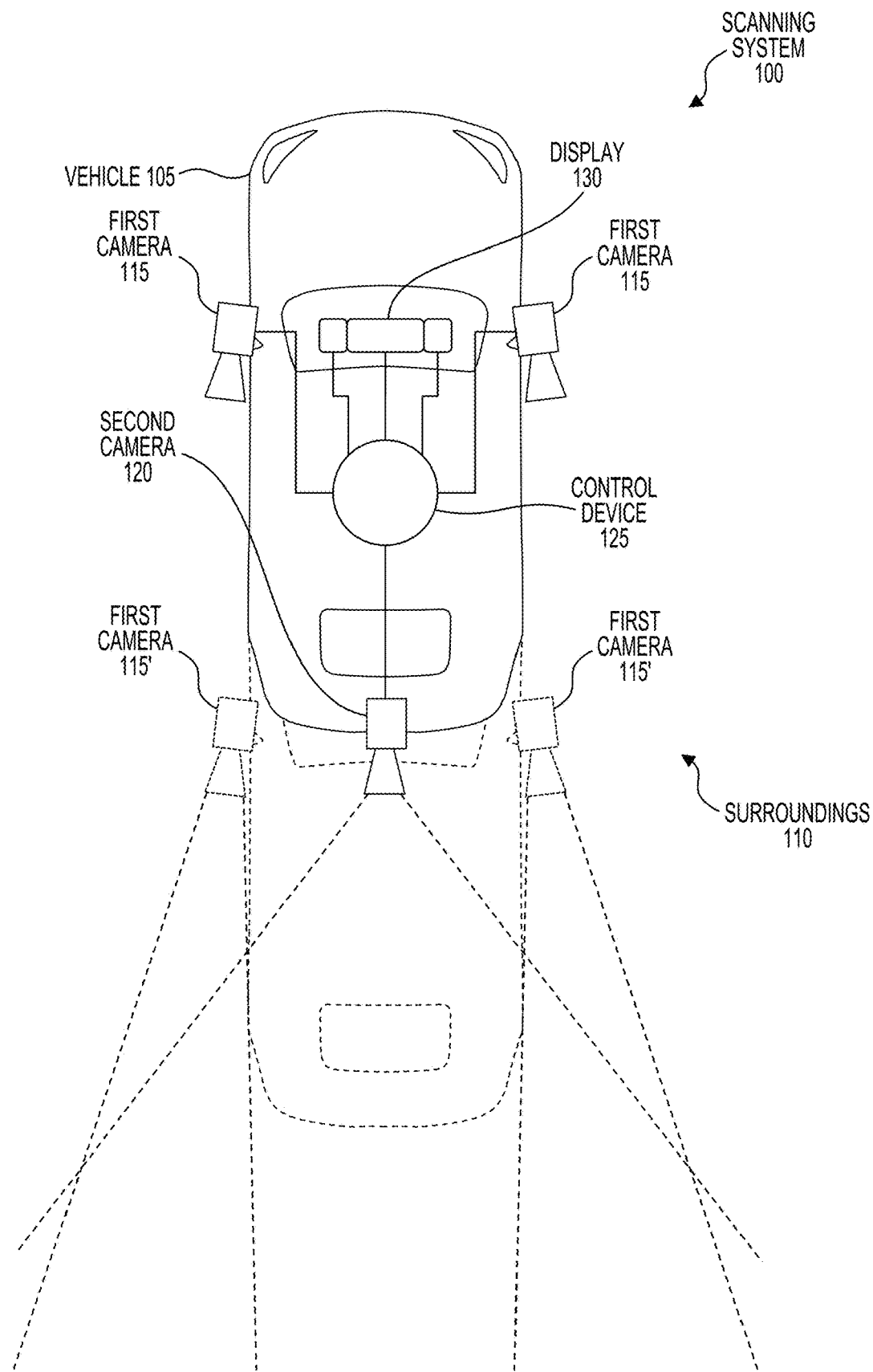
FIG. 1 illustrates a vehicle having a scanning system.

FIG. 1 shows (not to scale) a scanning system 100 on board a vehicle 105. The vehicle 105 preferably comprises a motor vehicle, in particular a passenger vehicle, a truck, a motorcycle, or a bus. The scanning system 100 is configured to optically scan the surroundings 110 of the vehicle 105 and to provide a representative display on board the vehicle 105.

The scanning system 100 comprises a first camera 115 and a second camera 120, which are attached offset in relation to one another on the vehicle 105 with respect to a movement direction of the vehicle 105. The movement direction of the vehicle 105 typically extends forward, upward in the illustration of FIG. 1. For example, two first cameras 115 are provided, which are attached on a left and a right outer side of the vehicle 105 in order to each scan a section of the surroundings 110 located laterally behind the vehicle 105. The second camera 120 is attached farther to the rear on the vehicle 105 than the first camera 115, for example, on a rear of the vehicle 105, a rear edge of a roof, a rear window, or a rear hatch. The second camera 120 is typically attached in the center with respect to a longitudinal axis of the vehicle 105 and is configured to scan a section of the surroundings 110 located behind the vehicle 105. Scanning ranges of the cameras 115 and 120 can partially overlap one another.

Furthermore, the scanning system 100 comprises a control device 125 for processing images which are scanned by the cameras 115, 120. In some embodiments, the control device 125 can activate one of the cameras 115, 120 to scan an image.

A provided image can be output on board the vehicle 105. A display 130 can be provided for this purpose, which can be read off in the interior by a person, in particular a driver of the vehicle 105. Three displays 130 are shown by way of example, of which a left one can be assigned to the left first camera 115, a middle one can be assigned to the second camera 120, and a right one can be assigned to the right first camera 115. In another embodiment, a single display 130 can also be provided, on which different display surfaces can be assigned to the individual cameras 115, 120. In still a further embodiment, the control device 125 is configured to provide a single overall image, which is displayed on a single display surface of a display 130.

To reduce a parallax error between images of a first camera 115 and the second camera 120, it is proposed that a first image be scanned and initially temporarily stored by the first camera 115. A second image is scanned with a time delay by the second camera 120 when a position of the second camera 120 is located closer with respect to the movement direction of the vehicle 105 to a position of the first camera 115 at the point in time of the production of the first image than the first camera 115 is attached offset from the second camera 120 on board the vehicle 105.

The vehicle 105 is shown at an earlier point in time by dashed lines in FIG. 1, at which the surroundings 110 were scanned by one of the first cameras 115. First cameras 115' are shown by dashed lines for this point in time. It is proposed that the time delay between the scanning by the first camera 115 and the scanning by the second camera 120 be selected as much as possible so that the longitudinal movement of the vehicle 105 during the delay corresponds to a distance of the first camera 115 with respect to the second camera 120 on the vehicle 105 in the longitudinal direction.

Figure 2:
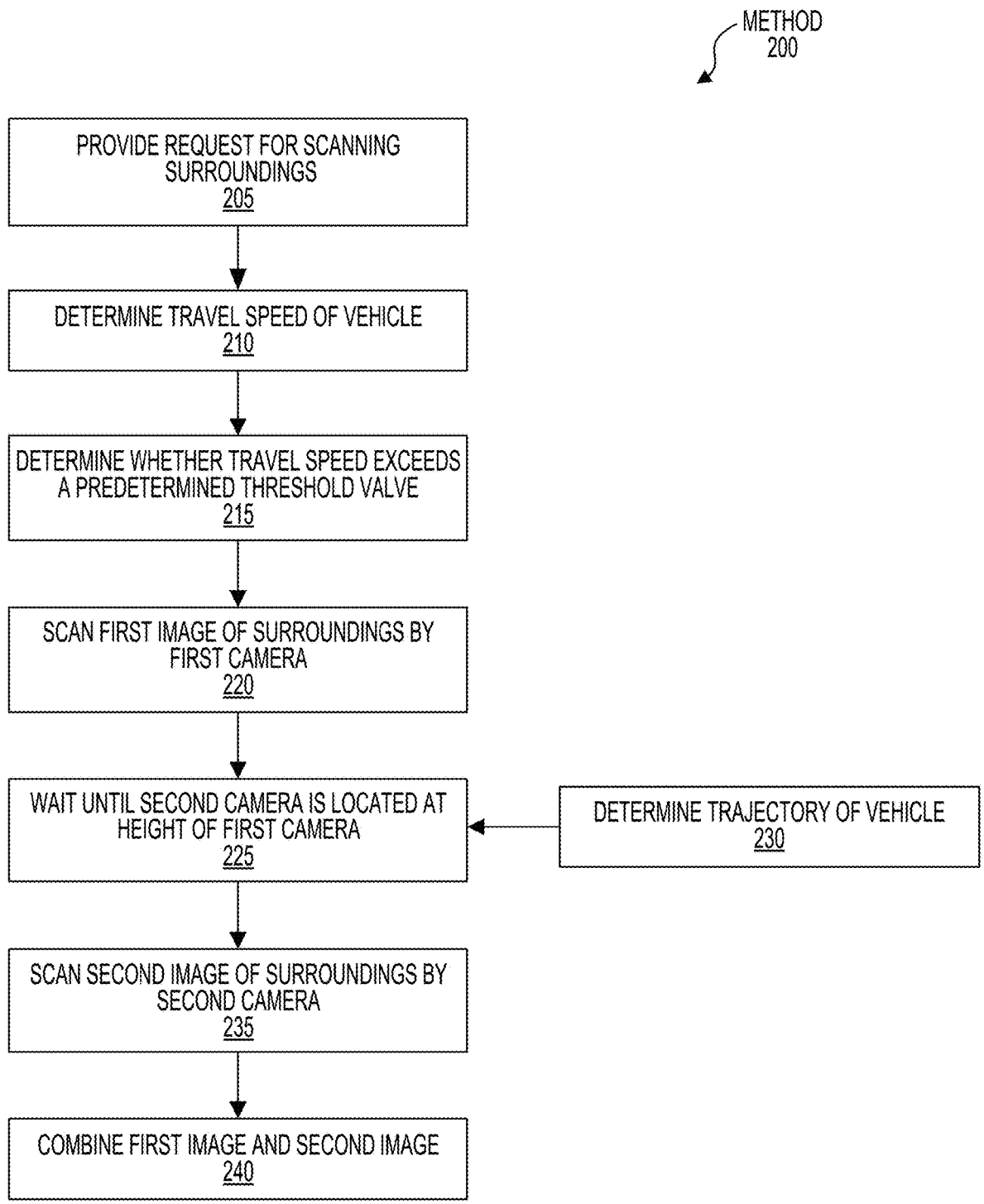
FIG. 2 illustrates a flow chart of a method.

FIG. 2 shows a flow chart of an exemplary method 200 for providing a scan of the surroundings 110 on board a vehicle 105.

In a step 205, a request for scanning the surroundings 110 is provided. Subsequently, in a step 210, a travel speed of the vehicle 105 can be determined. The travel speed can be determined in the longitudinal direction or along a trajectory through which the vehicle 105 travels.

Optionally, it can be determined in a step 215 whether the travel speed of the vehicle 105 exceeds a predetermined threshold value. The threshold value can be determined in that the offset of the cameras 115, 120 in the longitudinal direction is divided by a maximum technically required time delay between the scanning of the surroundings 110 by the different cameras 115 and 120. This maximum time delay can be significant in particular if the cameras 115 and 120 each scan periodic images of the surroundings 110. If the cameras 115, 120 simultaneously produce images periodically, the maximum time delay can thus correspond to the inverse of the period. The period on typical cameras is an integer multiple of $\frac{1}{15}$ s. On a typical vehicle 105, the minimum travel speed is more than 100 km/h when converted. If the vehicle 105 is not sufficiently fast, images can thus be scanned and provided by the cameras 115 and 120 in a typical manner.

In a further embodiment, it can be taken into consideration when the display 130 displays an image. This typically takes place at a predetermined frequency, for example, 60 Hz. Images are preferably recorded by the first camera 115 and the second camera 120 in such a way that as little time as possible passes between the provision of the overall image and the display of the overall image on the display 130. The scanning of the surroundings 110 can thus also be synchronized on the display 130.

In a step 220, a first image of the surroundings 110 can be scanned by the front, first camera 115. In a step 225, it is possible to wait until the rear, second camera 120 is located as accurately as possible at the height of the first camera 115 at the point in time of the scanning of the first image. To determine this point in time, a distance of the cameras 115, 120 on the vehicle 105 along the movement direction can be divided by the determined travel speed of the vehicle 105. Optionally, a more accurate observation can also take place in that it is taken into consideration that the vehicle 105 possibly does not move along a straight line, but rather along a curve. For this purpose, a trajectory of the vehicle 105 can be determined in a step 230. The trajectory can be determined, for example, on the basis of a sequence of positions or a speed or acceleration of the vehicle 105.

After passage of the time delay, in a step 235, a second image of the surroundings 110 can be scanned by the rear, second camera 120. The scanned first and second images can be combined with one another in a step 240. For this purpose, for example, perspectives, focal lengths, or exposures of the images can be equalized with one another. Optionally, the images can be assembled by stitching to form an overall image. The overall image, which comprises the individual images or only still comprises a combined image, can be output on board the vehicle 105, for example, on the display 130.

It is to be noted that the method 200, in a first variant, comprises a control of a point in time at which one of the cameras 115, 120 scans the surroundings 110, while in a second variant, from a sequence of first or second images which are scanned by a first camera 115 or a second camera 120, one is sought to assign a first image and a second image to one another which were recorded at locations lying as close as possible to one another with respect to the surroundings 110.

Figure 3:
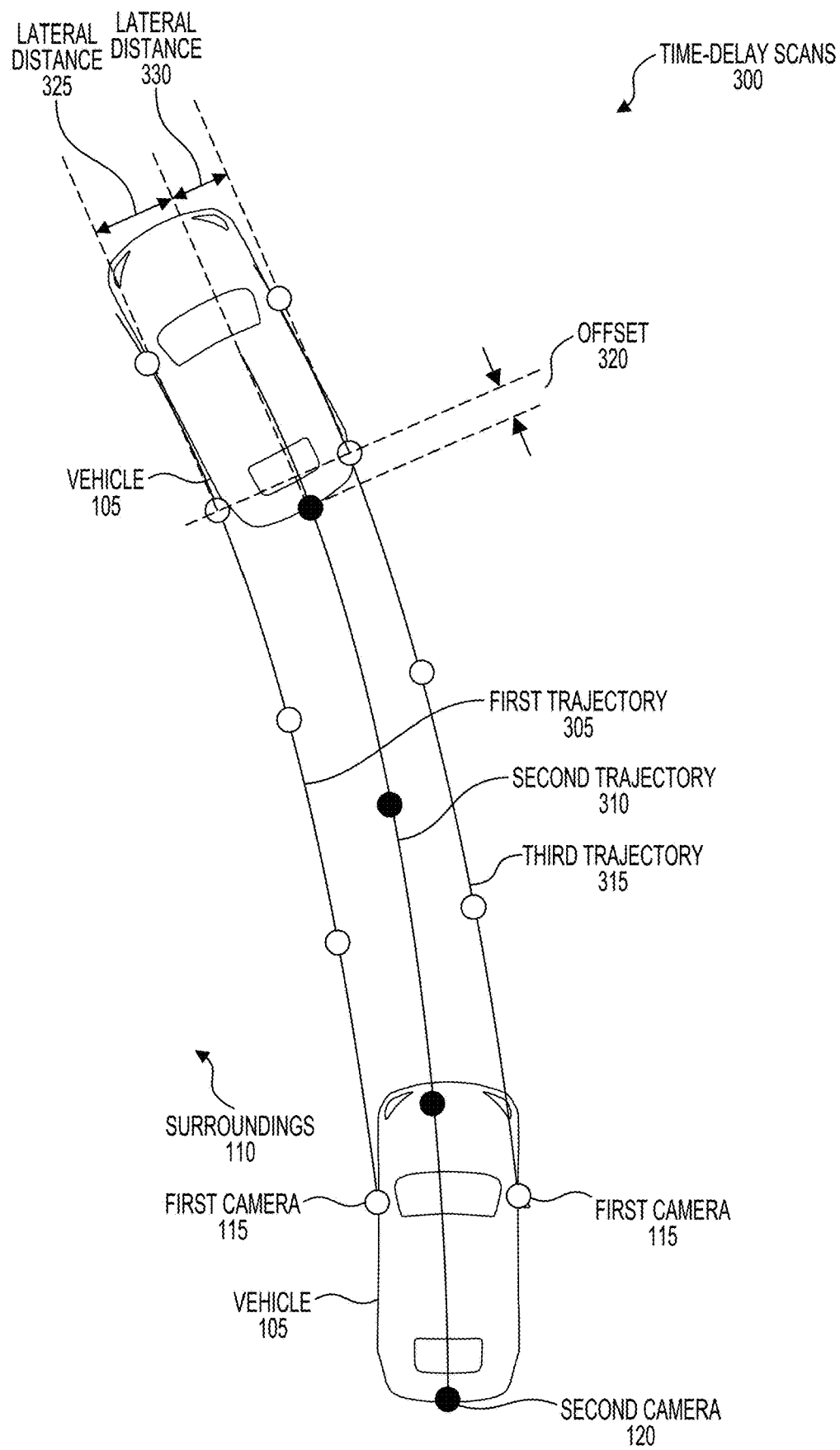
FIG. 3 illustrates an illustration of time-delayed scans.

FIG. 3 shows an illustration 300 of time-delayed scans on board a vehicle 105 in an exemplary scenario. The vehicle 105 shown in the lower region drives along a trajectory which curves toward the top left in the illustration of FIG. 3. The left first camera 115 follows a first trajectory 305 here, the right first camera 115 a second trajectory 310, and the second camera 120 a third trajectory 315. All cameras 115, 120 produce scans of the surroundings 110 periodically and synchronized with one another. Positions at which the cameras 115 each scan the surroundings 110 are shown by light circles and positions at which the second camera 120 scans the surroundings 110 are shown by dark circles.

The vehicle 105 is shown at a later point in time in the upper region of FIG. 3. First positions of the first camera 115 and a second position of the second camera 120 are assigned to one another in such a way that a resulting offset 320 along the movement direction of the vehicle 105 is minimized. The resulting offset 320 expresses the length by which the position of the second camera 120 is offset at the point in time of the scanning of the second image along the movement direction of the vehicle 105 in relation to a first position of a first camera 115. The resulting offset 320 in the longitudinal direction can be minimized and ideally brought to zero by matching selection of the delay between the first and the second scan.

In the lower illustration of the vehicle 105, it can be seen that the position of the second camera 120 transverse to the movement direction of the vehicle 105 lies precisely between the cameras 115. With respect to the positions at which the cameras 115, 120 are located at points in time of the scanning, which are assigned to one another to form the overall image, however, this does not apply. It can be seen in the upper region of FIG. 3 that a lateral distance 325 between the position of the second camera 120 and the assigned position of the left first camera 115 is greater than a lateral distance 330 to the assigned position of the right first camera 115. To compensate for this inequality, the first images of the first cameras 125 can be shifted to the right by the difference amount of the distances 325, 330 or the second image can be shifted to the left by the difference amount.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 100 scanning system
105 vehicle
110 surroundings
115 first camera
115' first camera (earlier point in time)
120 second camera
125 control device
130 display
200 method
205 request for image scan 210 determine vehicle speed
215 vehicle sufficiently fast?
220 scan image using front camera
225 wait until rear camera is at height of the front camera
230 determine trajectory
235 scan image using rear camera
240 combine images
300 illustration
305 first trajectory (left first camera)
310 second trajectory (right first camera)
315 third trajectory (second camera)
320 resulting offset in the longitudinal direction
325 lateral distance left
330 lateral distance right

The invention claimed is:

1. A method for scanning surroundings of a vehicle, wherein the vehicle moves in relation to the surroundings along a movement direction, wherein the vehicle comprises a first camera and a second camera, and wherein the first camera is arranged in front of the second camera along the movement direction, the method comprising:
scanning a first image by the first camera;
scanning a second image by the second camera; and
combining the first image and the second image to form an overall image;
wherein the second image is scanned with a time delay in relation to the first image;
wherein the second camera provides a plurality of second images at a predetermined frequency;
wherein the second image is selected from the plurality of second images such that a first offset between a first location of the first camera at which the first image was scanned and a second location of the second camera at which the second image was scanned is minimized; and
wherein the first offset is less than a second offset between positions of the first camera and the second camera on board the vehicle.

2. The method according to claim 1, wherein the first image and the second image are provided simultaneously on different display surfaces on board the vehicle.

3. The method according to claim 2, wherein the first image and the second image are combined by stitching to form the overall image.

4. The method according to claim 1, wherein the time delay between the scanning of the first image and the scanning of the second image is determined as a function of a movement speed of the vehicle.

5. The method according to claim 1, wherein the first camera and the second camera each provide images at the predetermined frequency.

6. The method according to claim 1, wherein the overall image is determined in consideration of a distance of the locations transverse to the travel direction.

7. The method according to claim 6, wherein the distance is determined based on a yaw movement of the vehicle during the time delay.

8. A scanning system on board a vehicle, which moves in relation to surroundings along a movement direction, the scanning system comprising:
a first camera for scanning a first image of the surroundings;
a second camera for scanning a second image of the surroundings, wherein the cameras are arranged offset along the movement direction; and
a control device, which is configured to provide the second image with a time delay in relation to the first image;
wherein the second camera is configured to provide a plurality of second images at a predetermined frequency; and
wherein the control device is configured to select a second image from the plurality of second images such that a first offset between a first location of the first camera at which the first image was scanned and a second location of the second camera at which the second image was scanned is minimized with respect to a location at which the first image was scanned; and
wherein the first offset is less than a second offset between positions of the first camera and the second camera on board the vehicle.

9. A vehicle comprising the scanning system according to claim 8.

* * * * *